US012240432B2

(12) United States Patent
Liu et al.

(10) Patent No.: US 12,240,432 B2
(45) Date of Patent: Mar. 4, 2025

(54) SYSTEMS AND METHODS FOR VARIABLE BRAKE HOLD ACTUATION AND RELEASE

(71) Applicant: TOYOTA RESEARCH INSTITUTE, INC., Los Altos, CA (US)

(72) Inventors: Yiting Liu, Los Altos, CA (US); Hirofumi Yamamoto, Los Altos, CA (US); Chen Bao, Los Altos, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 340 days.

(21) Appl. No.: 17/729,521

(22) Filed: Apr. 26, 2022

(65) Prior Publication Data
US 2023/0339441 A1 Oct. 26, 2023

(51) Int. Cl.
*B60T 8/17* (2006.01)
*B60T 7/12* (2006.01)

(52) U.S. Cl.
CPC .............. *B60T 8/17* (2013.01); *B60T 7/122* (2013.01); *B60T 2201/06* (2013.01); *B60T 2210/20* (2013.01); *B60T 2210/30* (2013.01); *B60T 2250/00* (2013.01)

(58) Field of Classification Search
CPC ........ B60T 8/17; B60T 7/122; B60T 2201/06; B60T 2210/20; B60T 2210/30; B60T 2250/00
USPC .......................................................... 701/70
See application file for complete search history.

(56) References Cited

U.S. PATENT DOCUMENTS

| 10,688,975 | B2 | 6/2020 | Brinkman | |
|---|---|---|---|---|
| 2020/0180578 | A1* | 6/2020 | Watanabe | B60T 8/245 |
| 2021/0039613 | A1* | 2/2021 | Kakeshita | B60T 7/22 |
| 2021/0237722 | A1 | 8/2021 | Suzuki | |
| 2021/0237766 | A1 | 8/2021 | Suzuki | |
| 2021/0253123 | A1 | 8/2021 | Ikuma | |

FOREIGN PATENT DOCUMENTS

| CN | 112977430 X | 6/2021 |
|---|---|---|
| CN | 113276826 | 8/2021 |

OTHER PUBLICATIONS

Semmler, "Honda Continues to Add to its Safety Arsenal," South Bend Tribune, Oct. 24, 2020, 1 page (https://www.southbendtribune.com/story/business/2020/10/24/honda-continues-to-add-to-its-safety-arsenal/116270654/).
Korosec, "Ghost Wants to Retrofit Your Car so it Can Drive Itself on Highways in 2020," TechCrunch, Nov. 7, 2019, 4 pages (https://techcrunch.com/2019/11/07/ghost-wants-to-retrofit-your-car-so-it-can-drive-itself-on-highways-by-2020/).

* cited by examiner

*Primary Examiner* — Yi-Kai Wang
(74) *Attorney, Agent, or Firm* — SHEPPARD, MULLIN, RICHTER & HAMPTON LLP; Daniel N. Yannuzzi

(57) ABSTRACT

Systems and methods are provided for variable actuation and release of a vehicle's brake hold mechanism/function. A brake hold device may be implemented as a "tuner" or controller that can connect to and override, e.g., the default functionality of an existing brake hold mechanism of a vehicle. Delays in exiting a brake hold state, repetitive actuation of an accelerator to exit a brake hold state, and other shortcomings associated with the conventional operation of brake hold mechanisms may be avoided by taking into account relevant vehicle operating conditions or environmental/road/traffic conditions.

20 Claims, 6 Drawing Sheets

SYSTEMS AND METHODS FOR VARIABLE BRAKE HOLD ACTUATION AND RELEASE

TECHNICAL FIELD

The present disclosure relates generally to braking systems and methods. More particularly, the present disclosure relates to dynamic and variable actuation or release of a vehicle's brake hold function to increase vehicle efficiency and performance.

DESCRIPTION OF RELATED ART

A brake hold feature, also referred as hill hold/assist, may be provided in vehicles, the use of which retains brake pressure when a vehicle comes to a stop. That is, the brake hold feature engages the vehicle's braking system without the driver having to maintain or hold his/her foot on the brake pedal. Brake hold can be useful in scenarios, such as city driving, when stopped on an incline/decline, or in other situations where maintaining brake pressure would be beneficial. Typically, the brake hold state can be exited, i.e., the brake pressure can be released, when the driver actuates the accelerator or gas pedal.

BRIEF SUMMARY OF THE DISCLOSURE

In accordance with some embodiments, a brake hold tuner may comprise a memory unit operatively connected to the processor and including instructions, that when executed, causes the processor to: intercept signals at least one of received by or generated by a vehicle, the intercepted signals intended for receipt by a brake hold mechanism of the vehicle; and based on the intercepted signals and vehicle operating efficiency factors, override operation of the brake hold mechanism and control at least one of initiating a brake hold state, exiting a brake hold state, and forgoing initiation of a brake hold state.

In accordance with some embodiments, a brake hold tuner may further comprise a controller area network (CAN) bus interface for connecting to a CAN bus of the vehicle and enabling the interception of the signals.

In some embodiments, the instructions further cause the processor to obtain information regarding the vehicle operating efficiency factors by obtaining perceived vehicle-related conditions including vehicle operating conditions, and conditions external to the vehicle. In some embodiments, the conditions external to the vehicle comprise at least one of environmental conditions and road conditions. In some embodiments, the at least one of the environmental conditions and road conditions comprises at least one of currently-monitored environmental conditions and road conditions, and past-monitored environmental conditions and road conditions.

In some embodiments, the vehicle operating conditions comprise at least one of currently-monitored vehicle operating conditions and past monitored vehicle operating conditions.

In some embodiments, the instructions that cause the processor to control exiting a brake hold state comprise instructions to exit the brake hold state effectuated by the brake hold mechanism prior to an operator of the vehicle actuating an accelerator mechanism that would otherwise cause exiting of the brake hold state by the brake hold mechanism of the vehicle.

In some embodiments, the instructions that cause the processor to forgo initiation of the brake hold state comprises instructions to override effectuation of the brake hold state that would otherwise occur in accordance with control by the brake hold mechanism of the vehicle.

In some embodiments, the instructions that cause the processor to initiate a brake hold state comprise instructions to calculate whether an amount of time expected to be spent in the brake hold state matches or exceeds a minimum brake hold state time threshold.

In accordance with some embodiments, a vehicle may comprise a processor, and a memory unit operatively connected to the processor and including instructions, that when executed, causes the processor to: perceive vehicle-related conditions; determine whether a brake hold mechanism of the vehicle is enabled; when the brake hold mechanism is enabled, determine whether a brake hold state is warranted based on the perceived vehicle-related conditions; alter a default effectuation of the brake hold mechanism based on the perceived vehicle-related conditions when the brake hold state is warranted; and alter a default non-effectuation of the brake hold mechanism based on the perceived vehicle-related conditions when the brake hold state is not warranted.

In some embodiments, the instructions causing the processor to perceive vehicle-related conditions comprises monitoring vehicle operating conditions, and conditions external to the vehicle.

In some embodiments, the conditions external to the vehicle comprise at least one of environmental conditions and road conditions.

In some embodiments, the vehicle operating conditions comprise at least one of currently monitored vehicle operating conditions and past monitored vehicle operating conditions.

In some embodiments, the at least one of the environmental conditions and road conditions comprises at least one of currently monitored environmental conditions and road conditions, and past monitored environmental conditions and road conditions.

In some embodiments, the instructions that cause the processor to alter the default effectuation of the brake hold mechanism comprises instructions to exit the brake hold state effectuated by the brake hold mechanism prior to an operator of the vehicle actuating an accelerator mechanism that would otherwise conventionally cause exiting of the brake hold state.

In some embodiments, the instructions that cause the processor to alter the default effectuation of the brake hold mechanism comprises instructions to override effectuation of the brake hold state that would otherwise conventionally occur.

In some embodiments, the instructions that cause the processor to determine whether the brake hold state is warranted comprises instructions to calculate whether an amount of time expected to be spent in the brake hold state matches or exceeds a minimum brake hold state time threshold.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
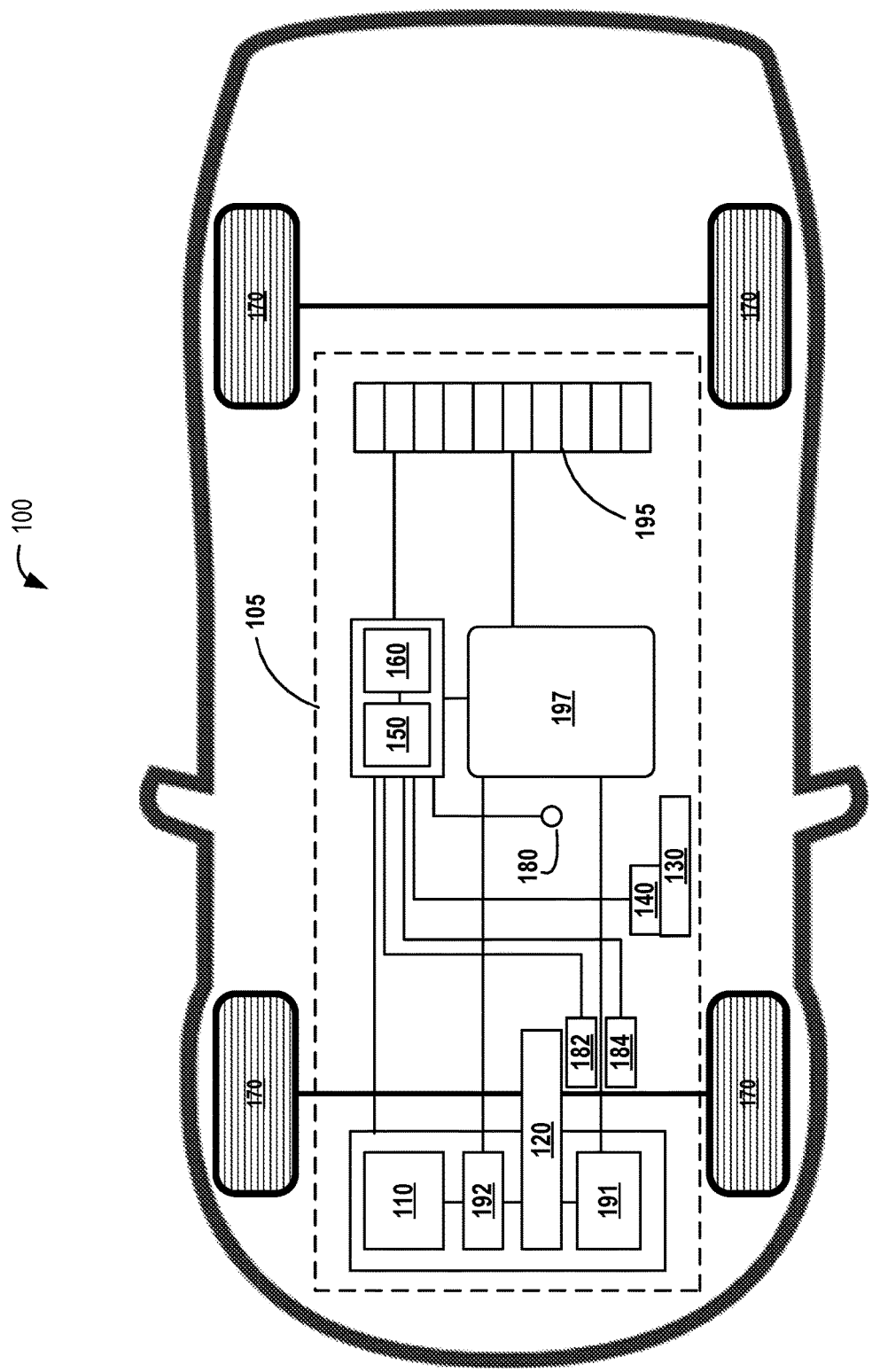
FIG. 1 is a schematic representation of an example vehicle with which embodiments of the systems and methods disclosed herein may be implemented.

The figures are not exhaustive and do not limit the present disclosure to the precise form disclosed.

DETAILED DESCRIPTION

As alluded to above, a conventional brake hold mechanism enables a driver of a vehicle to maintain a stop or brake hold state without the need to continually depress a brake pedal when the vehicle stops at a red light, stops due to a traffic jam, and so on. To release the brake hold state, the driver need only depress the vehicle's accelerator pedal. It should be noted that the term accelerator pedal can refer to a gas pedal or other non-gas, e.g., motor-generator (MG) actuator (in the case of an electric vehicle (EV)), whether a pedal or other actuatable device/mechanism, the enablement of which, initiates vehicle motion. Such a brake hold feature can reduce the imposition on the driver by negating the need for the driver to maintain brake pedal actuation in various scenarios.

However, problems exist with conventional brake hold operation. For example, maintaining high brake pressure (used to effectuate the brake hold state) for too long a period can be detrimental to the brake system or components (brake cylinders, hydraulic pressure components, etc.) of the vehicle. Thus, a driver may need to periodically actuate the accelerator or gas pedal to release the brake hold state. In a scenario where traffic is heavy, for example, this can result in the driver having to provide frequent manual inputs (depressing the accelerator pedal).

Furthermore, the release of the brake hold state is typically accompanied with latency or a delay, e.g., approximately 0.4 to 0.6 seconds according to some observations. That is, after a driver depresses a vehicle's accelerator pedal (to exit a brake hold state), there will be a noticeable/perceptible delay before the vehicle is able to begin moving again. This can be detrimental to the driving experience. For example, such latency is directly contrary to the touted advantage of EV's ability to accelerate without any delay (versus ICE vehicles). Even in autonomous vehicles or semi-autonomous vehicles, or vehicles that utilized advanced driver assistance systems (ADAS), collectively referred to herein, as autonomous control/vehicles, the riding experience can be negatively impacted with such latency. That is, even though a passenger need not manually actuate an accelerator pedal, there is still a perceptible delay following the exiting from a brake hold state, which a passenger might not understand, and may find annoying/other detrimental to the riding experience. With internal combustion engine (ICE) vehicles, hybrid EVs, or EVs, fuel or energy efficiency can be negatively impacted. For example, repeated braking/acceleration can consume more fuel or battery energy.

Thus, in accordance with various embodiments, systems and methods are provided for variable actuation and release of a vehicle's brake hold mechanism/function. In some embodiments, a brake hold device may be configured or implemented as a "tuner" or controller that can connect to and override, e.g., the default functionality of an existing brake hold device/mechanism of a vehicle. In other words, such a brake hold tuner can piggyback off of a vehicle's exiting brake hold device or controller. It should be noted that in other embodiments, the functionality of the brake hold tuner may be integrated into a vehicle's brake hold system or may be configured as such, originally/during manufacturing. However, the ability with some embodiments to implement variable brake hold actuation and release, allows the advantages of dynamic or selective brake hold operation to be realized on any vehicle without a need to fundamentally alter the vehicle's existing brake hold mechanism/function.

In some embodiments, the intelligence directing the variable actuation and release of the brake hold function may be implemented in/as a tuner or controller that can be operatively connected to a vehicle's existing brake hold device or controller, e.g., brake hold electronic control unit (ECU). For example, in some embodiments, the brake hold tuner may be connected to a vehicle's controller area network (CAN) bus. The brake hold tuner, may, via the CAN bus, intercept brake hold control signals or brake hold relevant sensor signals and override the default operation of the conventional/resident brake hold device. In other words, and for example, the brake hold tuner may take, as input, brake hold control signals or brake hold relevant sensor signals, and output, variable brake hold actuation or release control signals instead of the vehicle's resident brake hold ECU.

A conventional brake hold mechanism operates in more or less, a binary fashion, i.e., when the brake hold function is enabled, the vehicle will enter a brake hold state upon actuation of the vehicle's brakes and the vehicle comes to a stop (has a vehicle speed of zero). Thereafter, when a driver of the vehicle actuates the vehicle's accelerator pedal, the brake hold mechanism is released thereby exiting the brake hold state. After some delay (alluded to above), the vehicle will begin moving. However, when a brake hold tuner in accordance with embodiments is operatively connected to the vehicle's existing brake hold ECU, for example, the brake hold tuner can receive (or obtain) information regarding the vehicle's operating condition(s), road condition(s), environmental condition(s), or any other information or data relevant to or impacting actuation or release of the brake hold function.

It should be noted that the aforementioned information or data can be current, future, or even historical information/data. For example, current traffic conditions in an area where a vehicle is currently traveling may comprise stop-and-go traffic. In some embodiments, such current traffic conditions may be analyzed by the brake hold tuner, resulting in the brake hold tuner making a determination to not initiate a brake hold state each/every time the driver of the vehicle actuates the vehicle's brake pedal and comes to a stop.

As another example, consider a scenario where the vehicle is approaching and ultimately stops at a traffic signal (having perceived the traffic signal change states from green to red). If the traffic signal was previously encountered by the vehicle (or is known by virtue of a high definition map leveraged by the vehicle, and for which, the signal change timing is known, the brake hold tuner may automatically end the brake hold state in advance of the traffic signal change from red to green. In this way, the aforementioned delay associated with brake hold can be pre-empted or avoided. It should be understood that in such an embodiment, the conventional brake hold delay remains, but the delay is "hidden" from the driving experience or masked by virtue of the brake hold release being initiated prior to a driver actuating the vehicle's accelerator pedal, for example. That is, from the driver's perspective, by the time he/she actuates the accelerator pedal, the delay period has passed, and the vehicle "appears" to begin moving immediately. In an autonomous vehicle, when a passenger, e.g., perceives the traffic signal change from red to green, the autonomous vehicle will begin to move immediately, again, because the conventional brake hold delay period has already passed by virtue of releasing the brake hold state early.

The systems and methods disclosed herein may be implemented with or by any of a number of different vehicles and vehicle types. For example, the systems and methods disclosed herein may be used with automobiles, trucks, motorcycles, recreational vehicles and other like on- or off-road vehicles. In addition, the principles disclosed herein may also extend to other vehicle types as well. An example hybrid electric vehicle is illustrated and described below as one example.

FIG. 1 illustrates an example hybrid electric vehicle (HEV) 100 in which various embodiments for driver disengagement of autonomous vehicle/driving controls may be implemented. It should be understood that various embodiments disclosed herein may be applicable to/used in various vehicles (internal combustion engine (ICE) vehicles, fully electric vehicles (EVs), etc.) that are fully or partially autonomously controlled/operated, not only HEVs.

HEV 100 can include drive force unit 105 and wheels 170. Drive force unit 105 may include an engine 110, motor generators (MGs) 191 and 192, a battery 195, an inverter 197, a brake pedal 130, a brake pedal sensor 140, a transmission 120, a memory 160, an electronic control unit (ECU) 150, a shifter 180, a speed sensor 182, and an accelerometer 184.

Engine 110 primarily drives the wheels 170. Engine 110 can be an ICE that combusts fuel, such as gasoline, ethanol, diesel, biofuel, or other types of fuels which are suitable for combustion. The torque output by engine 110 is received by the transmission 120. MGs 191 and 192 can also output torque to the transmission 120. Engine 110 and MGs 191 and 192 may be coupled through a planetary gear (not shown in FIG. 1B). The transmission 120 delivers an applied torque to the wheels 170. The torque output by engine 110 does not directly translate into the applied torque to the wheels 170.

MGs 191 and 192 can serve as motors which output torque in a drive mode, and can serve as generators to recharge the battery 195 in a regeneration mode. The electric power delivered from or to MGs 191 and 192 passes through inverter 197 to battery 195. Brake pedal sensor 140 can detect pressure applied to brake pedal 130, which may further affect the applied torque to wheels 170. Speed sensor 182 is connected to an output shaft of transmission 120 to detect a speed input which is converted into a vehicle speed by ECU 150. Accelerometer 184 is connected to the body of HEV 100 to detect the actual deceleration of HEV 100, which corresponds to a deceleration torque.

Transmission 120 is a transmission suitable for an HEV. For example, transmission 120 can be an electronically controlled continuously variable transmission (ECVT), which is coupled to engine 110 as well as to MGs 191 and 192. Transmission 120 can deliver torque output from a combination of engine 110 and MGs 191 and 192. The ECU 150 controls the transmission 120, utilizing data stored in memory 160 to determine the applied torque delivered to the wheels 170. For example, ECU 150 may determine that at a certain vehicle speed, engine 110 should provide a fraction of the applied torque to the wheels while MG 191 provides most of the applied torque. ECU 150 and transmission 120 can control an engine speed ($N_E$) of engine 110 independently of the vehicle speed ($N_V$).

ECU 150 may include circuitry to control the above aspects of vehicle operation. ECU 150 may include, for example, a microcomputer that includes a one or more processing units (e.g., microprocessors), memory storage (e.g., RAM, ROM, etc.), and I/O devices. ECU 150 may execute instructions stored in memory to control one or more electrical systems or subsystems in the vehicle. ECU 150 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS), electronic parking brake (EPB), or electronic stability control (ESC)), battery management systems, and so on. These various control units can be implemented using two or more separate electronic control units, or using a single electronic control unit.

MGs 191 and 192 each may be a permanent magnet type synchronous motor including for example, a rotor with a permanent magnet embedded therein. MGs 191 and 192 may each be driven by an inverter controlled by a control signal from ECU 150 so as to convert direct current (DC) power from battery 195 to alternating current (AC) power, and supply the AC power to MGs 191, 192. MG 192 may be driven by electric power generated by motor generator MG191. It should be understood that in embodiments where MG191 and MG192 are DC motors, no inverter is required. The inverter, in conjunction with a converter assembly may also accept power from one or more of MGs 191, 192 (e.g., during engine charging), convert this power from AC back to DC, and use this power to charge battery 195 (hence the name, motor generator). ECU 150 may control the inverter, adjust driving current supplied to MG 192, and adjust the current received from MG191 during regenerative coasting and braking.

Battery 195 may be implemented as one or more batteries or other power storage devices including, for example, lead-acid batteries, lithium ion, and nickel batteries, capacitive storage devices, and so on. Battery 195 may also be charged by one or more of MGs 191, 192, such as, for example, by regenerative braking or by coasting during which one or more of MGs 191, 192 operates as generator. Alternatively (or additionally, battery 195 can be charged by MG 191, for example, when HEV 100 is in idle (not moving/not in drive). Further still, battery 195 may be charged by a battery charger (not shown) that receives energy from engine 110. The battery charger may be switched or otherwise controlled to engage/disengage it with battery 195. For example, an alternator or generator may be coupled directly or indirectly to a drive shaft of engine 110 to generate an electrical current as a result of the operation of engine 110. Still other embodiments contemplate the use of one or more additional motor generators to power the rear wheels of a vehicle (e.g., in vehicles equipped with 4-Wheel Drive), or using two rear motor generators, each powering a rear wheel.

Battery 195 may also be used to power other electrical or electronic systems in the vehicle. Battery 195 can include, for example, one or more batteries, capacitive storage units, or other storage reservoirs suitable for storing electrical energy that can be used to power MG 191 and/or MG 192. When battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2:
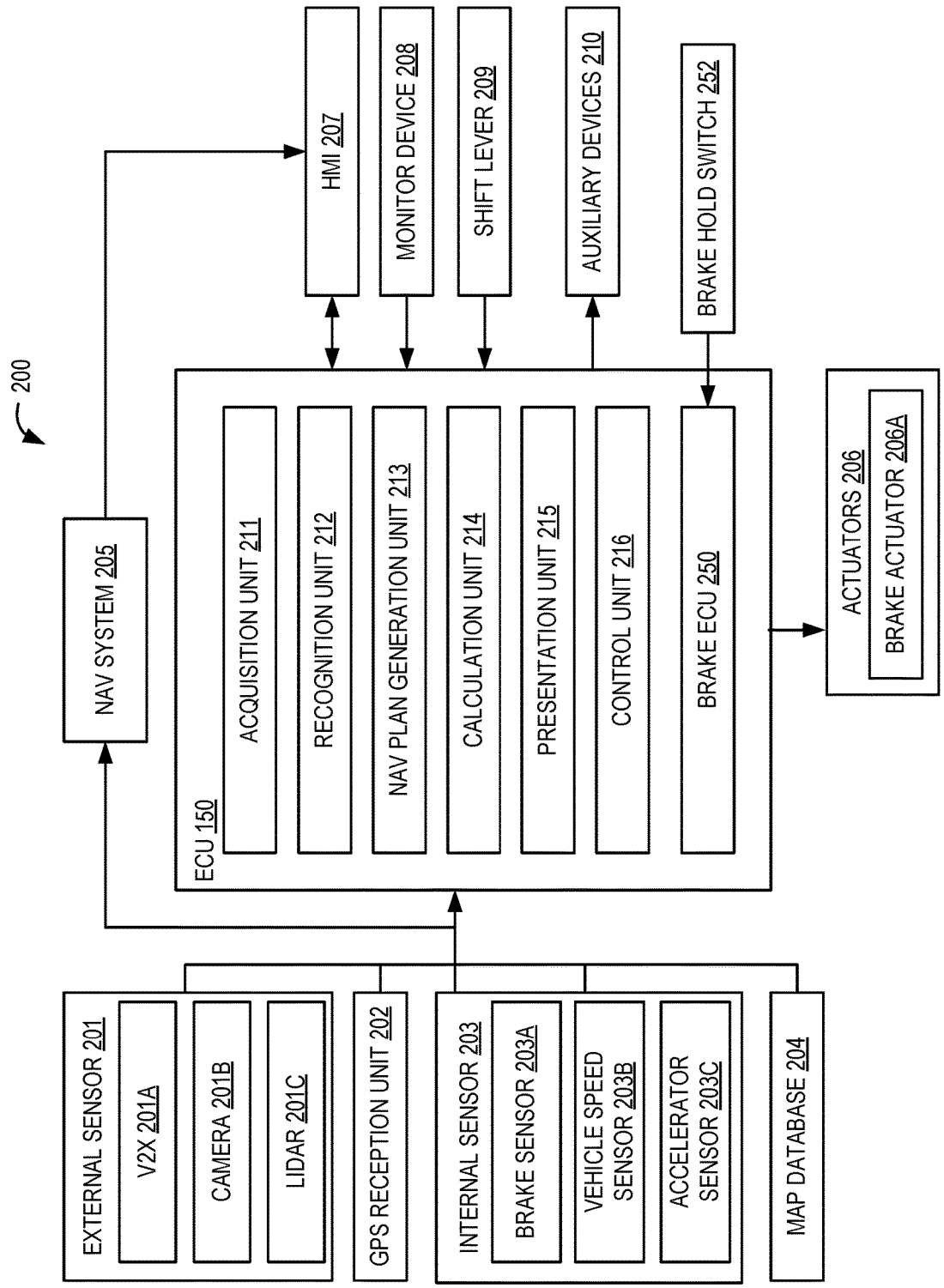
FIG. 2 illustrates an example autonomous control system that includes a brake hold feature.

FIG. 2 illustrates an example autonomous control system 200 that may be used to autonomously control a vehicle, e.g., HEV 100. Autonomous control system 200 may be installed in HEV 100, and executes autonomous control of HEV 100. As described herein, autonomous control can refer to control that executes driving/assistive driving operations such as acceleration, deceleration, and/or steering of a vehicle, generally movement of the vehicle, without depending or relying on driving operations/directions by a driver or operator of the vehicle.

As an example, autonomous control may include a lane keeping assist control where a steering wheel (not shown) is steered automatically (namely, without depending on a steering operation by the driver) such that HEV 100 does not depart from a running lane. That is, the steering wheel is automatically operated/controlled such that HEV 100 runs along the running lane, even when the driver does not perform any steering operation.

As another example, autonomous control may include navigation control, where when there is no preceding vehicle in front of the HEV 100, constant speed (cruise) control is effectuated to make HEV 100 run at a predetermined constant speed. When there is a preceding vehicle in front of HEV 100, follow-up control is effectuated to adjust HEV 100's speed according to a distance between HEV 100 and the preceding vehicle.

In some scenarios, switching from autonomous control to manual driving may be executed. For example, when an operation amount of any of a steering operation, an acceleration operation, and brake operation by the driver of HEV 100 during the autonomous driving control becomes equal to or more than a threshold, autonomous control system 200 may execute a switch from autonomous control to manual control.

It should be understood that manual control or manual driving can refer to a vehicle operating status wherein a vehicle's operation is based mainly on driver-controlled operations/maneuvers. In an ADAS context, driving operation support control can be performed during manual driving. For example, a driver may be actively performing any of a steering operation, an acceleration operation, and a brake operation of the vehicle, while autonomous control apparatus 200 performs some subset of one or more of those operations, e.g., in an assistive, complementary, or corrective manner. As another example, driving operation support control adds or subtracts an operation amount to or from the operation amount of the manual driving (steering, acceleration, or deceleration) that is performed by the driver.

In the example shown in FIG. 2, autonomous control system 200 is provided with an external sensor 201, a GPS (Global Positioning System) reception unit 202, an internal sensor 203, a map database 204, a navigation system 205, actuators 206, an HMI (Human Machine Interface) 207, a monitor device 208, a shift lever 209, auxiliary devices 210. Autonomous control system 200 may communicate with ECU 150, or in some embodiments (may be implemented with its own ECU).

In the example shown in FIG. 2, external sensor 201 is a detector that detects external circumstances such as surrounding information of HEV 100. The external sensor 201 may include a camera 210B, a Laser Imaging Detection and Ranging (LIDAR) unit 201C, and a vehicle-to-everything (V2X) receiver 201A. Other sensors may be included as an external sensor 201, e.g., a radar unit.

The camera 201B may be an imaging device that images the external circumstances surrounding the vehicle. For example, the camera is provided on a back side of a front windshield of the vehicle. The camera may be a monocular camera or a stereo camera. The camera 201B outputs, to the ECU 150, image information on the external circumstances surrounding the vehicle. The camera 201B is not limited to a visible light wavelength camera but can be an infrared camera.

The LIDAR unit 201C uses light waves to detect obstacles outside of the vehicle by transmitting light waves to the surroundings of the vehicle, and receiving reflected light waves from an obstacle to detect the obstacle, distance to the obstacle or a relative positional direction of the obstacle. The LIDAR unit outputs detected obstacle information to the ECU 150.

A V2X receiver 210A may be a radio or other electronic device including a transmitter or receiver operable to send/receive wireless messages using any V2X communications protocol. Examples of V2X protocols include, but are not limited to, e.g., dedicated short-range communication (DSRC), Long Term Evolution (LTE), millimeter wave communication, 5G-V2X, and so on.

In the example shown in FIG. 2, GPS reception unit 202 receives signals from three or more GPS satellites to obtain position information indicating a position of HEV 100. For example, the position information can include latitude information and longitude information. The GPS reception unit 202 outputs the measured position information of the vehicle to the ECU 150.

In the example shown in FIG. 2, the internal sensor 203 can refer to a detector(s) for detecting information regarding, e.g., a running status of HEV 100, operational/operating conditions, e.g., amount of steering wheel actuation, rotation, angle, amount of acceleration, accelerator pedal depression, brake operation by the driver of HEV 100. The internal sensor 203 includes at least one of a vehicle speed sensor 203B, an accelerator (pedal) sensor 203C, a brake (pedal) sensor 203A, and other sensors, e.g., a yaw rate sensor, a steering sensor, an acceleration sensor (not shown, but well-understood in the art), etc.

Vehicle speed sensor 203B is a detector that detects a speed of the HEV 100. In some embodiments, HEV 100's speed may be measured directly or through calculations/inference depending on the operating conditions/status of one or more other components of HEV 100. For example, a wheel speed sensor can be used as the vehicle speed sensor 203B to detect a rotational speed of the wheel, which can be outputted to ECU 150.

The acceleration sensor can be a detector that detects actuation of an accelerator pedal (or other accelerator actuator) of HEV 100. For example, the acceleration sensor may include a longitudinal acceleration sensor for detecting a longitudinal acceleration of HEV 100, and a lateral acceleration sensor for detecting a lateral acceleration of HEV 100. The acceleration sensor outputs, to the ECU 150, acceleration information.

The yaw rate sensor can be a detector that detects a yaw rate (rotation angular velocity) around a vertical axis passing through the center of gravity of HEV 100. For example, a gyroscopic sensor is used as the yaw rate sensor. The yaw rate sensor outputs, to the ECU 150, yaw rate information including the yaw rate of HEV 100.

The steering sensor may be a detector that detects an amount of a steering operation/actuation with respect to a steering wheel 30 by the driver of HEV 100. The steering operation amount detected by the steering sensor may be a steering angle of the steering wheel or a steering torque applied to the steering wheel, for example. The steering sensor outputs, to the ECU 150, information including the steering angle of the steering wheel or the steering torque applied to the steering wheel of HEV 100.

The accelerator sensor 203C may be a detector that detects a stroke amount of an accelerator pedal, for example, a pedal position of the accelerator pedal with respect to a reference position. The reference position may be a fixed position or a variable position depending on a determined parameter. The accelerator sensor 203C is provided on a shaft portion of the accelerator pedal of the vehicle, for example. The accelerator sensor 203C outputs, to the ECU 150, operation information reflecting the stroke amount of the accelerator pedal.

The brake pedal sensor 203a may be a detector that detects a stroke amount of a brake pedal, for example, a pedal position of the brake pedal with respect to a reference position. Like the accelerator position, a brake pedal reference position may be a fixed position or a variable position depending on a determined parameter. The brake pedal sensor 203a may detect an operation force of the brake pedal (e.g. force on the brake pedal, oil pressure of a master cylinder, and so on). The brake pedal sensor 203a outputs, to the ECU 150, operation information reflecting the stroke amount or the operation force of the brake pedal.

A map database 204 may be a database including map information, such as, e.g., what is known in the art as a high definition (HD) map. The map database 204 is implemented, for example, in a disk drive or other memory installed in HEV 100. The map information may include road position information, road shape information, intersection position information, and fork position information, for example. The road shape information may include information regarding a road type such as a curve and a straight line, and a curvature angle of the curve. When autonomous control system 200 uses a Simultaneous Localization and Mapping (SLAM) technology or position information of blocking structural objects such as buildings and walls, the map information may further include an output signal from external sensor 201. In some embodiments, map database 204 may be a remote data base or repository with which HEV 100 communicates.

Navigation system 205 may be a component or series of interoperating components that guides the driver of HEV 100 to a destination on a map designated by the driver of HEV 100. For example, navigation system 205 may calculate a route followed or to be followed by HEV 100, based on the position information of HEV 100 measured by GPS reception unit 202 and map information of map database 204. The route may indicate a running lane of a section(s) of roadway in which HEV 100 traverses, for example. Navigation system 205 calculates a target route from the current position of HEV 100 to the destination, and notifies the driver of the target route through a display, e.g., a display of a head unit, HMI 207 (described below), and/or via audio through a speaker(s) for example. The navigation system 205 outputs, to the ECU 150, information of the target route for HEV 100. In some embodiments, navigation system 205 may use information stored in a remote database, like map database 204, and/or some information processing center with which HEV 100 can communicate. A part of the processing executed by the navigation system 205 may be executed remotely as well.

Actuators 206 may be devices that execute running controls of HEV 100. The actuators 206 may include, for example, a throttle actuator, a brake actuator, and a steering actuator. For example, the throttle actuator controls, in accordance with a control signal output from the ECU 150, an amount by which to open the throttle of HEV 100 to control a driving force (the engine) of HEV 100. In another example, actuators 206 may include one or more of MGs 191 and 192, where a control signal is supplied from the ECU 150 to MGs 191 and/or 192 to output motive force/energy. The brake actuator controls, in accordance with a control signal output from the ECU 150, the amount of braking force to be applied to each wheel of the vehicle, for example, by a hydraulic brake system. The steering actuator controls, in accordance with a control signal output from the ECU 150, driving an assist motor of an electric power steering system that controls steering torque.

HMI 207 may be an interface used for communicating information between a passenger(s) (including the operator) of HEV 100 and autonomous control system 200. For example, the HMI 207 may include a display panel for displaying image information for the passenger(s), a speaker for outputting audio information, and operation buttons or a touch panel used by the occupant for performing an input operation. HMI 207 may also or alternatively transmit the information to the passenger(s) through a mobile information terminal connected wirelessly and receive the input operation by the passenger(s) through the mobile information terminal.

Monitor device 208 monitors a status of the driver/operator. The monitor device 208 can check a manual driving preparation state of the driver. More specifically, the monitor device 208 can check, for example, whether or not the driver is ready to start manual operation of HEV 100. Moreover, the monitor device 208 can check, for example, whether or not the driver has some intention of switching HEV 100 to a manual mode of operation.

For example, the monitor device 208 may be a camera that can take an image of the driver, where the image can be used for estimating the degree to which the driver's eyes are open, the direction of the driver's gaze, whether or not the driver is holding the steering wheel, etc. Monitor device 208 may also be a pressure sensor for detecting the amount of pressure the driver's hand(s) are applying to the steering wheel. As another example, the monitor device 208 can be a camera that takes an image of a hand of the driver.

A shift lever 209 can be positioned at a shift position, e.g., "A (AUTOMATIC)," "D (DRIVE)," etc. The shift position "A" indicates, for example, an automatic engage mode where autonomous control is engaged automatically. The shift position "D" indicates a triggered engage mode where autonomous control is engaged in response to a driver-initiated request to operate HEV 100 in an autonomous driving mode.

Auxiliary devices 210 may include devices that can be operated by the driver of the vehicle, but are not necessarily drive-related, such as actuators 206. For example, auxiliary devices 210 may include a direction indicator, a headlight, a windshield wiper and the like.

ECU 150 may execute autonomous control of the vehicle, and may include an acquisition unit 211, a recognition unit 212, a navigation plan generation unit 213, a calculation unit 214, a presentation unit 215, and a control unit 216.

Acquisition unit 211 may obtain the following operation amounts or levels of actuation based on the information obtained by the internal sensor 203: steering operation, acceleration operation, and brake operation by the driver during an autonomous control mode; and the level of steering operation, acceleration operation, and brake operation by the driver of the vehicle during a manual control mode.

Recognition unit 212 may recognize or assess the environment surrounding or neighboring HEV 100 based on the information obtained by the external sensor 201, the GPS reception unit 202, and/or the map database 204. For example, the recognition unit 212 includes an obstacle recognition unit (not shown), a road width recognition unit (not shown), and a facility recognition unit (not shown). The obstacle recognition unit recognizes, based on the information obtained by the external sensor 201, obstacles surrounding the vehicle. For example, the obstacles recognized by the obstacle recognition unit include moving objects such as pedestrians, other vehicles, motorcycles, and bicycles and stationary objects such as a road lane boundary (white line, yellow line), a curb, a guard rail, poles, a median strip, buildings and trees. The obstacle recognition unit obtains information regarding a distance between the obstacle and the vehicle, a position of the obstacle, a direction, a relative velocity, a relative acceleration of the obstacle with respect to the vehicle, and a category and attribution of the obstacle. The category of the obstacle includes a pedestrian, another vehicle, a moving object, and a stationary object. The attribution of the obstacle can refer to a property of the obstacle such as hardness and a shape of the obstacle.

The facility recognition unit recognizes, based on the map information obtained from the map database 204 and/or the vehicle position information obtained by the GPS reception unit 202, whether or not HEV 100 is operating/being driven through an intersection, in a parking structure, etc. The facility recognition unit may recognize, based on the map information and the vehicle position information, whether or not the vehicle is running in a school zone, near a childcare facility, near a school, or near a park, etc.

Navigation plan generation unit 213 may generate a navigation plan for HEV 100 based on the target route calculated by the navigation system 205, the information on obstacles surrounding HEV 100 recognized by recognition unit 212, and/or the map information obtained from map database 204. The navigation plan may be reflect one or more operating conditions/controls to effectuate the target route. For example, the navigation plan can include a target speed, a target acceleration, a target deceleration, a target direction, and/or a target steering angle with which HEV 100 should be operated at any point(s) along the target route so that the target route can be achieved to reach a desired destination. It should be understood that navigation plan generation unit 213 generates the navigation plan such that HEV 100 operates along the target route while satisfying one or more criteria and/or constraints, including, for example, safety constraints, legal compliance rules, operating (fuel/energy) efficiency, and the like. Moreover, based on the existence of obstacles surrounding HEV 100, the navigation plan generation unit 213 generates the navigation plan for the vehicle so as to avoid contact with such obstacles.

Calculation unit 214 may calculate a threshold used for determining whether or not to switch from autonomous control to manual driving or vice versa. The determination can be performed based on the operating levels associated with the manner in which the driver is operating HEV 100 during autonomous control which is obtained by the acquisition unit 211. For example, the driver of HEV 100 may suddenly grasp the steering wheel (which can be sensed by internal sensor 203) and stomp on the brake pedal (which can be sensed by monitor device 208). The pressure on the steering wheel and the level of actuation of the brake pedal may be excessive enough (exceed a threshold) suggesting that the driver intends to override the autonomous control system 200.

Presentation unit 215 displays, on a display of the HMI 207, a threshold which is calculated by the calculation unit 214 and used for determining whether or not to execute the switching from autonomous control to the manual driving or vice versa.

Control unit 216 can autonomously control HEV 100 based on the navigation plan generated by navigation plan generation unit 213. The control unit 216 outputs, to the actuators 206, control signals according to the navigation plan. That is, the control unit 216 controls actuators 206 based on the navigation plan, and thereby autonomous control of HEV 100 is executed/achieved. Moreover, certain levels of operation, e.g., steering wheel actuation, by the driver can be detected by the acquisition unit 211.

In some embodiments, data collection can comprise monitoring the operation of autonomous control system or aspects thereof, e.g., control unit 216 over time. Thus, the aforementioned data/information that is stored/logged can include time-series data involving some subset of or all aspects of autonomous control system 200. For example, commands from control unit 216 to actuators 206 may be monitored, and time-series data representative of the operating states/conditions of control unit 216 may be captured.

Further illustrated in FIG. 2, are elements (in addition to the previously described elements/components) that may be part of HEV 100's braking system. For example, autonomous control system 200 may include a brake ECU 250, a brake hold switch 252, and a brake pedal actuator 206A.

Brake hold switch 252 may be some device, such as an electro-mechanical component that can be used by a vehicle operator (or other passenger/user) to toggle HEV 100's brake hold mechanism ON/OFF. Brake hold switch 252 may be located in the interior cabin of HEV 100, e.g., near a driver's seat, near shift lever 209, etc. A vehicle operator may actuate brake hold switch 252 to turn HEV 100's brake hold feature ON. For example, actuation of brake hold switch 252 may result in a control signal being sent to brake ECU 250 enabling the brake hold mechanism (which may comprise control elements/logic/circuitry in brake ECU 250) that enable HEV 100 to enter a brake hold state upon brake pedal sensor 203a sensing actuation of the brake pedal, via brake pedal actuator 206A, and the vehicle has come to a stop, e.g., vehicle speed has been sensed by vehicle speed sensors 203B to be zero or vehicle speed remains at zero for some threshold amount of time.

During operation of HEV 100, the driver may actuate brake actuator 205A by stepping on the brake pedal. Brake ECU 250 may send one or more control signals to one or more components of the braking system of HEV 100. For example, brake ECU 250 may initiate application of pressure, via hydraulic pressure components, to the brake cylinders proximate to wheels 170, eventually bringing HEV 100 to a stop. Thereafter, brake ECU 250 may maintain the application of pressure putting HEV 100 into a brake hold state, where the driver need not maintain actuation of the brake pedal, yet HEV 100 will remain stationary/stopped. When the driver actuates the accelerator pedal, accelerator sensor 203C will sense this actuation, and send a signal(s) to brake ECU 250. In response, brake ECU 250 may transmit one or more signals to the braking system, e.g., the aforementioned hydraulic pressure components, instructing the hydraulic pressure components to release the pressure being maintained on the brake cylinders. In this way, the HEV 100 will exit the brake hold state.

Figure 3:
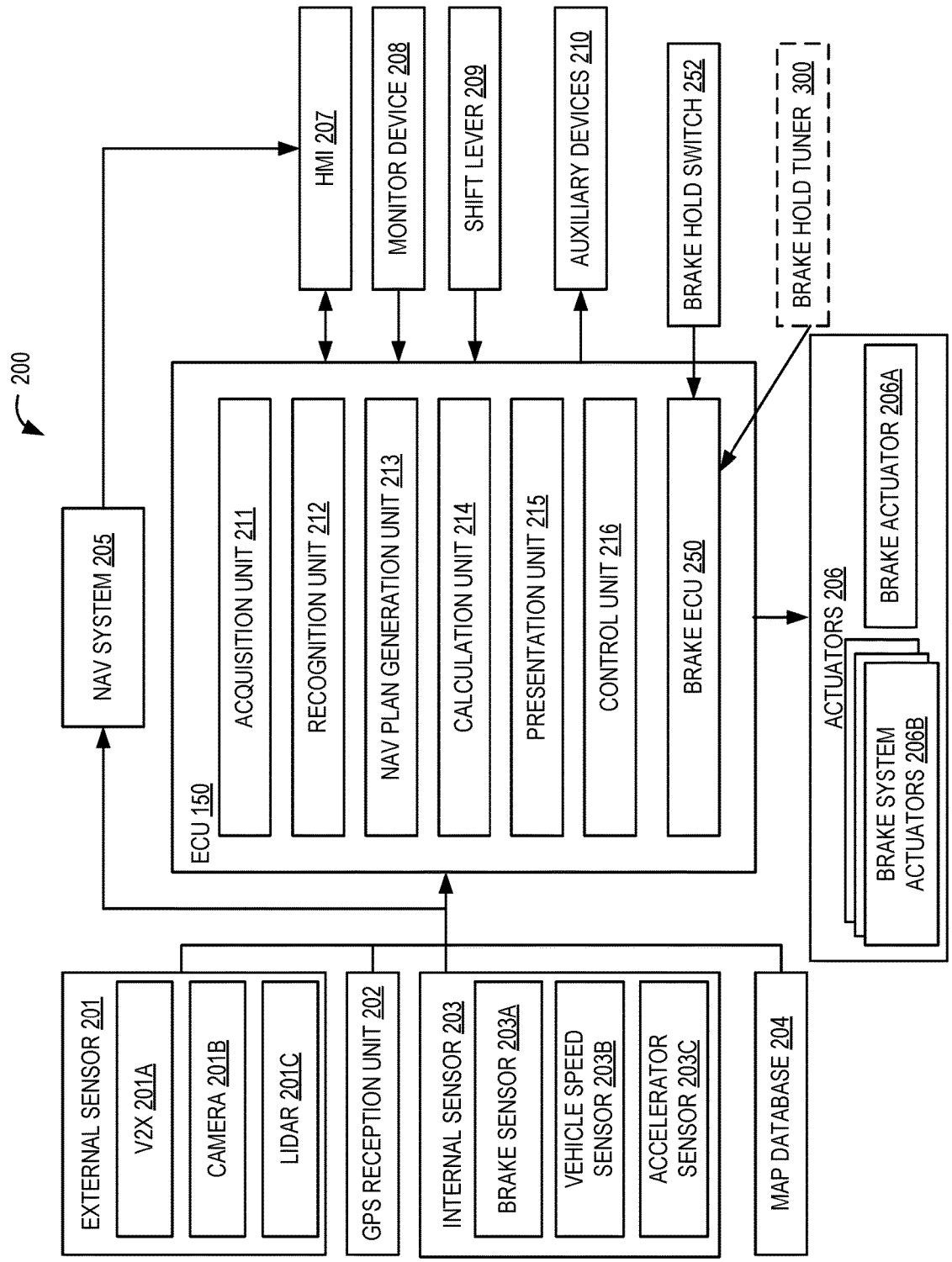
FIG. 3 illustrates the example autonomous control system of FIG. 2 to which an example brake hold tuner is operatively connected.

As noted above, the autonomous control system 200 (FIG. 2) may comprise a conventional brake hold system, whereas the autonomous control system 200 illustrated in FIG. 3 is adapted vis-à-vis use of a brake hold tuner. However, as noted above, in some embodiments, the functionality of the brake hold tuner, i.e., variable brake hold actuation and release, may be implemented as additional logic/circuitry and corresponding control in, e.g., brake hold ECU 250.

Referring to the example autonomous control system 200 of FIG. 3, it can be appreciated (as alluded to above), that a brake hold tuner 300 is provided to, in this embodiment, piggyback off of brake ECU 250. As explained above, brake hold tuner 300 may be connected to a vehicle CAN bus (not shown), e.g., brake hold tuner 300 may have a CAN bus port/interface allowing communications between brake hold tuner 300 and a CAN bus (or other event/status mechanism). As would be understood by those of ordinary skill in the art, a CAN bus can refer to a vehicle bus standard allowing microcontrollers or other devices to communicate with each other's applications without a host computer. That is, a CAN bus may utilize a message-based protocol. Although vehicle's typically use CAN buses, brake hold tuner 300 may be connected to any aspect/device/component of a vehicle, e.g., HEV 100 vis-à-vis any appropriate communication mechanism, event/state-monitoring mechanism, etc. Brake hold tuner 300 may operate based on sensor data/information received by some mechanism of HEV 100 that may be relevant to the brake hold function of HEV 100.

In the example embodiment illustrated in FIG. 3, external sensor 201 may, as discussed above, include a V2X component 201A, a camera unit 201B, and a LIDAR unit 201C. One or more of external sensors 201 may monitor the environment external to HEV 100, e.g., traffic conditions, obstacles in the path of HEV 100, road conditions affecting HEV 100, and so on. For example, camera 201B or V2X component 201A may sense or otherwise receive/obtain information indicating that a portion of upcoming roadway to be traversed by HEV 100 includes an uphill grade and an upcoming traffic signal. GPS reception unit 202 may provide information indicative of HEV 100's current location which may also provide insight into conditions/characteristics regarding the upcoming portion of roadway to be traversed. Map database 204 may be a source for one or more maps, such as HD maps, that provide insight into the upcoming traffic signal location, timing, etc. Internal sensor 203 may, as illustrated in FIG. 3, comprise sensors, such as the aforementioned brake pedal sensor 203*a*, vehicle speed sensor 203B, and accelerator sensor 203C.

The operation of such sensors may be the same or similar (as described above) as that in the context of conventional brake hold operation. That is, when brake hold switch 252 is activated or enabled, i.e., when the brake hold mechanism is ON, brake pedal sensor 203*a* may monitor HEV 100's brake pedal to detect actuation of the brake pedal. Upon detecting actuation of the brake pedal, brake pedal sensor 203*a* may transmit a signal(s) reflecting this detection to brake ECU 250 via a CAN bus. As noted above, brake hold tuner 300 may intercept such signals/messages intended for brake ECU 250. Interception of messages/signals is known in the art, and those of ordinary skill in the art would understand how messages/signals transmitted over a communications medium, e.g., the CAN bus, can be detected or sensed by brake hold tuner 300 such that brake hold tuner may take such signals as input into its processor to determine whether or not to put HEV 100 into a brake hold state. Thus, the logic or algorithms, or operating intelligence resident on brake hold tuner 300 may be used to analyze or process the received signals/messages (described in greater detail below and with reference to FIG. 5), instead of brake ECU 250. Vehicle speed sensor 203B may sense the speed of HEV 100 after actuation of the brake pedal. Vehicle speed sensor 203B may eventually sense that HEV 100 is motionless. At such time that vehicle speed sensor 203B transmits a signal indicating HEV 100's vehicle speed is zero, brake hold tuner 300 may analyze signals/messages from external sensors 201 to determine whether or not HEV 100 should be put into a brake hold state.

For example, based on external conditions information gleaned from external sensors 201 indicating (as noted in the above-described example) that HEV 100 is approaching a traffic signal, camera unit 201B/LIDAR unit 201C or GPS reception unit 202 may send a signal that brake hold tuner 300 intercepts indicating that the vehicle has indeed reached a point in the intersection proximate to the traffic signal where HEV 100 is/should be stopped.

Brake hold tuner 300 may access map database 204 to determine whether the timing of the traffic signal is known. Camera unit 201B or V2X unit 201A may provide information regarding when the upcoming traffic signal most recently changed colors, e.g., from yellow to red. This information can be compared to the information from map database 204, and brake hold tuner 300 may calculate how much time is remaining before the traffic signal will change colors from red to green. For example, brake hold tuner 300 may simply subtract the time the traffic light has been red in color from the total time the traffic signal should remain red in color.

If enough time before the traffic signal exceeds some minimum threshold time, where brake hold tuner 300 deems entering a brake hold state is warranted, brake hold tuner 300 may transmit a signal(s)/message(s) representative of an instruction to the brake system/brake system component actuator(s) 206B to enter a brake hold state. In some embodiments, such signal(s)/message(s) may be sent directly to brake system actuators 206B. In other embodiments, such signal(s)/message(s) may be sent via brake ECU 250 to brake system actuators 206B. Thus, brake system actuator(s) 206B may control, e.g., the application of the brake pressure via brake fluid to the brake cylinder.

As noted above, to avoid any latency or delay when resuming movement and upon exiting a brake hold state, pre-emptive exiting of the brake hold state may be effectuated. In this example, again depending on how much time that the traffic light is to remain the color red, brake hold tuner 300 may calculate how much time remains until the traffic light turns to the color green. Assuming the typical delay of approximately 0.4 to 0.6 seconds, brake hold tuner 300 sends a signal instructing brake system actuators 206B to disengage/exit the brake hold state approximately 0.4 to 0.6 seconds ahead of the time the traffic light is supposed to change color from red to green.

Brake hold tuner 300 may send the accelerator sensor 203C-detected actuation (which it intercepted) on to brake ECU 250 which in turn may prompt control unit 216 to send a signal(s)/message(s) to the appropriate components, e.g., throttle, to begin generating motive force via the ICE, for example, by regulating airflow into the ICE based on the level of actuation of the accelerator pedal. In this example, it should be understood that actuators 206 include a throttle valve actuator. In this way, upon the driver of HEV 100 depressing the accelerator pedal when the traffic signal actually turns green, the delay associated with exiting the brake hold state and initiating movement has already passed. Thus, it appears to the driver that HEV 100 begins moving immediately or substantially immediately upon depressing the accelerator pedal.

It should be understood the logic or algorithms used to control operation of brake hold tuner 300 may be more or less complicated depending on the desired operation or implementation of the brake hold feature. For example, if, in addition to the existence of the traffic light, as noted above, the intersection includes an uphill grade, the pre-emptive exiting of the brake hold state may occur slightly later than if there was no grade to the relevant portion of roadway. This is because, the influence of an uphill grade on HEV 100 may be such that HEV 100 immediately begins to roll/coast rearward (down the uphill grade in a direction opposite the intended direction of travel). Thus, brake hold tuner 300's logic may account for the reaction time of a driver being able to depress the accelerator pedal at exactly the time the traffic signal turns color. This is in contrast to a scenario where the portion of roadway where HEV 100 is stopped is level. Thus, even if HEV 100 exits the pre-emptive brake hold state prior to the driver depressing the accelerator pedal, HEV 100 remains stationary, and thus, if the driver is slow to actuate the accelerator pedal, there is no negative impact.

The above examples are not intended to be limiting in any way. Difference factors or parameters impacting or that are impacted as a result of the brake hold feature may be considered or taken into account when determining how/whether to actuate or release a brake hold state. For example, certain conditions may be weighted more heavily that others. In the above example, the consideration given to the uphill grade may be more heavily weighted than the existence of traffic. That is, and as noted above, in conventional brake hold implementations, a driver may have to periodically actuate the accelerator pedal to exit a brake hold state. In heavy traffic, this may be annoying to the driver by creating the imposition that he/she has to depress the accelerator pedal. Instead, by virtue of the use of brake hold tuner 300, the brake system components of HEV 100 may be instructed to maintain the brake hold state until a threshold period of time has elapsed, and the brake hold state is exited automatically without requiring driver input. On level ground, automatically exiting the brake hold state is an acceptable result/outcome as the brake hold state that can re-initiated/re-entered without any risk of movement that might create an unsafe condition/cause an accident. However, if the vehicle is on an uphill grade, automatically releasing the brake hold state may surprise the driver, and cause HEV 100 to begin rolling backwards. The driver would have to manually actuate the brake pedal as fast as he/she could to "catch" HEV 100 and stop it from moving backwards. Thus, information/signals that HEV 100 is stopped at an incline overrides the stop-and-go-traffic-based automatic brake hold release operation.

In other words, conventional implementations of a brake hold feature involve simply entering a brake hold state pursuant to application of the brakes, and maintaining brake pressure if a vehicle remains unmoving for some threshold amount of time, until application of the accelerator pedal. In contrast, embodiments of the present disclosure base actuation or release of the brake hold mechanism on data/information internal (to the vehicle) and external conditions to achieve more selective or dynamic implementation of the brake hold mechanism.

In some embodiments, historical data or information that has been previously sensed or collected may be a premise upon which actuation or release of the brake hold state can be based. As noted above, the reaction time of a driver regarding actuating the accelerator pedal of HEV 100 may be a factor in certain scenarios. Thus, in addition to using the timing data of a traffic signal, the release time of a brake hold state may further consider the historical reaction time or driving style of that particular driver. For example, if the driver has a historical tendency to "jump" on the accelerator pedal as soon as possible after a traffic signal turns green, brake hold tuner 300 may not need to account for driver-delayed reaction time. However, if the driver is older or has a history of waiting, e.g., a second before actuating the accelerator pedal after a traffic light has turned green, the brake hold tuner 300 may determine to maintain the brake hold state some appropriate amount of time longer. Similar considerations can be taken into account based on the type of vehicle at issue, how aggressive a vehicle's acceleration characteristics may be, and so on. For example, a large/heavy truck may need more time for the motive force generated by an ICE/MG to begin moving the large/heavy truck. Accordingly, the logic implemented in brake hold tuner 300 may account for such characteristics, and exit the brake hold state even sooner than in the vehicle at issue were a smaller sedan or sports car.

Figure 4:
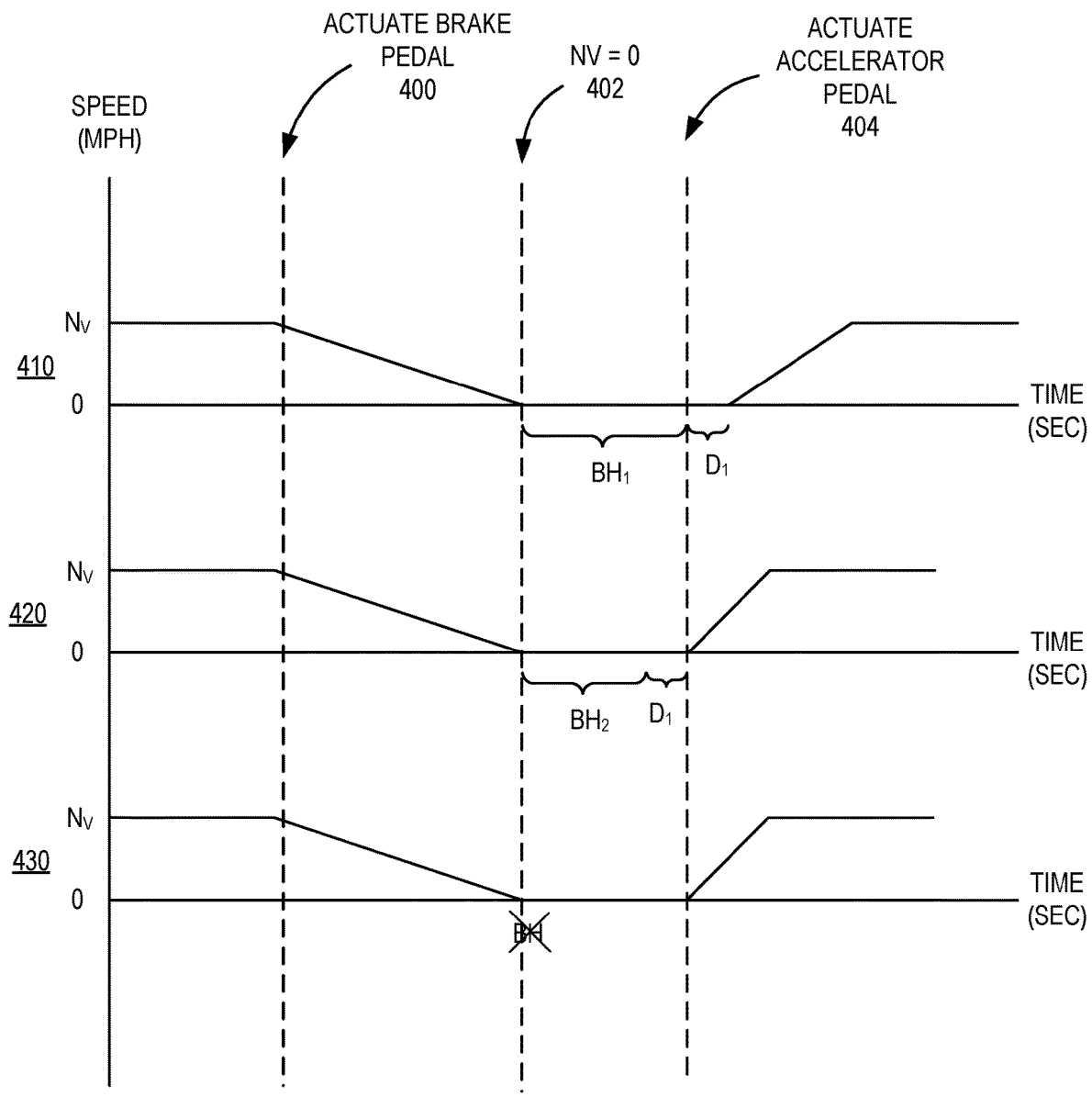
FIG. 4 illustrates a graphical comparison of the operation or use of conventional brake hold with examples of variable brake hold actuation and release.

FIG. 4 is a graphical representation of various brake hold scenarios, comparing the impact to brake hold states. As illustrated in FIG. 4, the vertical axis represents vehicle speed ($N_V$) while the horizontal axis represents time (in seconds). In a first scenario 410, a vehicle, such as HEV 100 may be traveling at some speed, $N_V$, until a driver actuates the brake pedal of the vehicle at a time 400. In the first scenario 410, it can be appreciated that the vehicle begins to slow down from time 400 until the speed of the vehicle falls to zero at time 402. Conventionally, and as explained above, after actuating the accelerator pedal at time 404, there is a delay until the vehicle begins moving, and speed begins increasing. Thus, despite actuating the accelerator pedal at time 404, the brake hold state exists for a time ($BH_1$), and the driver experiences a delay $D_1$ before the vehicle actually begins to move, and as illustrated in FIG. 4, the vehicle accelerates/the vehicle's speed begins to increase.

In the second scenario 420, a vehicle, such as HEV 100 may be traveling at some speed, $N_V$, until a driver actuates the brake pedal of the vehicle at a time 400. In the second scenario 420, it can be appreciated that the vehicle begins to slow down from time 400 until the speed of the vehicle falls to zero at time 402. In this second scenario 420, based on the conditions/determinations, the brake hold state may be exited prior to when the brake hold state would conventionally be exited. Thus, the break hold state time ($BH_2$) is shortened relative to brake hold state $BH_1$. Moreover, and although the same delay $D_1$ exists, as discussed above, the delay $D_1$ in the second scenario 420 occurs earlier, and thus, by the time the driver actuates the accelerator pedal at time 404, the delay $D_1$ has already passed.

In a third example scenario 430, a vehicle, such as HEV 100 may be traveling at some speed, $N_V$, until a driver actuates the brake pedal of the vehicle at a time 400. In the third scenario 430, it can be appreciated that the vehicle begins to slow down from time 400 until the speed of the vehicle falls to zero at time 402. In this third scenario 430, based on the conditions/determinations, the brake hold tuner, e.g., brake hold tuner 300 (FIG. 3) may determine that entering a brake hold state is not warranted because HEV 100 is in a stop-and-go traffic condition that would require the driver to repeatedly and periodically actuate the accelerator pedal to exit the brake hold state. If it is determined by the logic of brake hold tuner 300 that the threshold time needed to remain in a brake hold state is not met, the brake hold state is avoided altogether.

It should be understood that brake hold tuner 300 can be configured in a variety of ways. In some embodiments, the logic controlling brake hold tuner 300 may reflect different triggering levels according to which a brake hold state is or is not entered. For example, certain external or internal conditions may warrant immediate application of a brake hold state. For example, upon an internal sensor 203 detecting that HEV 100 is in parked state, by virtue of sensing actuation of shift lever 209 into the parked position, a brake hold state may be implemented with no other analysis/determination needed. An internal sensor 203 may determine that a door of HEV 100 is open, again, resulting in immediate or substantially immediate application of a brake hold state. Another level may be based on latency/efficiency improvement (in accordance with example second scenario 420), as described above, while another level may be based on eschewing application of a brake hold state (in accordance with example second scenario 430).

Likewise, although the embodiments described in detail and the corresponding illustrations exist in the context of autonomous vehicle control, one of ordinary skill in the art would understand that similar components, mechanisms, functionality, etc., may be implemented in an assisted vehicle control or even a manual vehicle control context. For example, in some embodiments, control of a vehicle may move between some level of autonomous control to some level of manual control. For example, operation of autonomous control system 200, would be understood as being adaptable to a manual driving context/system by simply understanding that instead of control unit 216 controlling operation of, e.g., actuators 206, a driver/operator would effectuate operation of the actuators 206 in accordance with a recommended route from navigation plan generation unit 213, for example.

Figure 5:
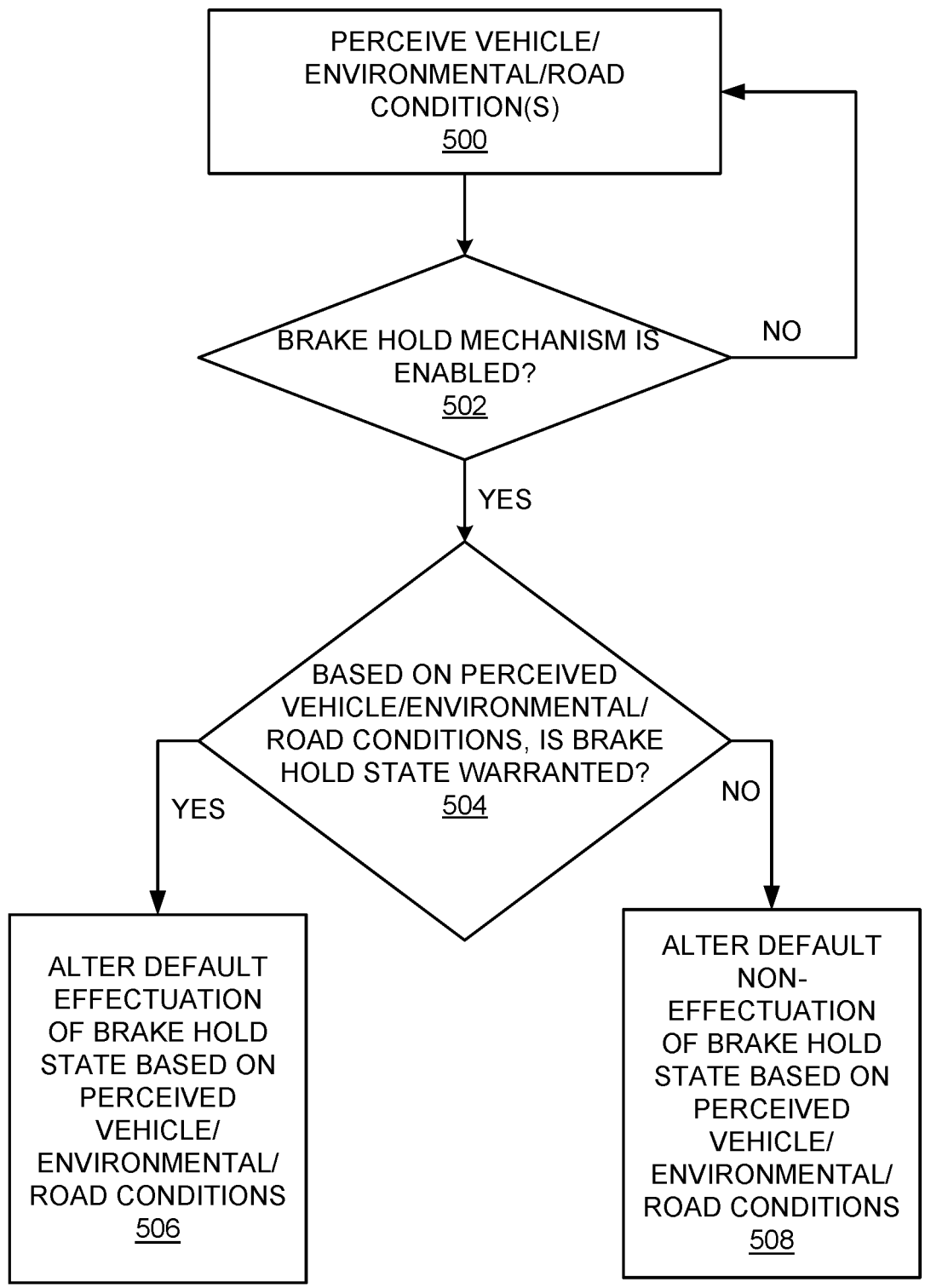
FIG. 5 is a flow chart illustrating operations that may be performed to effectuate variable brake hold actuation and release in accordance with one embodiment.

FIG. 5 is a flow chart illustrating example operations that may be performed to effectuate variable, dynamic, or selective application or release of a brake hold state. The operations illustrated in FIG. 5 and described herein may be performed, in some embodiments by brake holder tuner 300 or by brake ECU 250.

At operation 500, vehicle, environmental, and road conditions may be perceived. As discussed above, various internal or external sensors, as well as devices or systems capable of receiving or obtaining relevant information may provide information that allows a brake hold tuner, such as brake hold tuner 300, to determine what conditions may or may not warrant application of a brake hold state and for how long/how the brake hold state is to be exited. Such conditions may include, for example, the amount of traffic to be encountered or already encountered, the condition of a roadway being traversed by a vehicle, traffic signal timing, driver preferences/historical behavior, and so on.

At operation 502, a check is performed to determine if the brake hold mechanism is enabled. As described above, the brake hold mechanism or function may be enabled/disabled by a user actuating a brake hold switch, although other mechanisms may be appropriately used to activate the brake hold function. If not, the brake hold tuner may simply return to perceiving the relevant conditions. It should be understood that enabling the brake hold function to achieve a brake hold state can vary. The brake hold function is an energy-efficient manner with which to stop a vehicle from moving (internally), but, as noted above, at the cost of a slow(er) restart. In some embodiments, the brake hold function can be realized by the application of hydraulic pressure to the brake cylinders (even after the brake pedal is released). However, the brake hold function may also be achieved by, e.g., switching from the use of hydraulic pressure to the use of an electric parking brake (EPB) to maintain the brake hold state, or simply by using/applying pressure to the brake cylinders via some other energy efficient mechanism, such as a secondary braking system.

At operation 504, a determination is made regarding whether or not, based on the perceived vehicle, environmental, or road conditions, entering a brake hold state is warranted. At operation 506, if entering a brake hold state is warranted, default effectuation of the brake hold state is altered based on the perceived vehicle, environmental, and road conditions. At operation 508, if entering a brake hold state is not warranted, default non-effectuation of the brake hold state is altered based on the perceived vehicle, environmental, and road conditions. As discussed above, the perceived conditions can trigger application of a brake hold state while a brake hold state is avoided in the presence of other perceived conditions. For example, should road conditions reflect that the vehicle is stopped on an uphill grade, the brake hold state may be triggered. In the case of stop-and-go traffic, the brake hold state may, in some cases, not be triggered, e.g., if the repeated actuation of an accelerator pedal would create too much of an imposition on the driver.

It should be understood that in the event a determination is made, e.g., by brake hold tuner 300, not to enter into/maintain an altered brake hold state (until released), the brake hold tuner 300 may replicate the default operation in accordance with standard/conventional brake hold operation under the control of brake ECU 250. For example, brake hold tuner 300 can be configured to respond to certain scenarios based on user input/preferences/specifications. Accordingly, brake hold tuner 300 may be configured to operate in a default manner for certain situations/when warranted. In other embodiments, in such a situation, brake hold tuner 300 may simply pass control to brake ECU 250 to allow brake ECU 250 to control braking/brake hold as it normally would.

As discussed above, the brake hold tuner may intercept signals or messages indicating vehicle, environmental, or road conditions to make its determinations regarding whether or not to apply a brake hold state. If a brake hold state is warranted, the brake hold tuner may alter or override a default (or conventional) operation of the brake hold mechanism depending on the perceived vehicle, environmental, or road conditions. For example, and as described above, the brake hold tuner may initiate a pre-emptive release of the brake hold state to hide the delay associated with exiting the brake hold state. For example, application of the brake hold state may be avoided in stop-and-go traffic, where the default mode of operation of the brake hold mechanism would otherwise necessitate the driver repeatedly actuating the accelerator pedal to exit the brake hold state.

Figure 6:
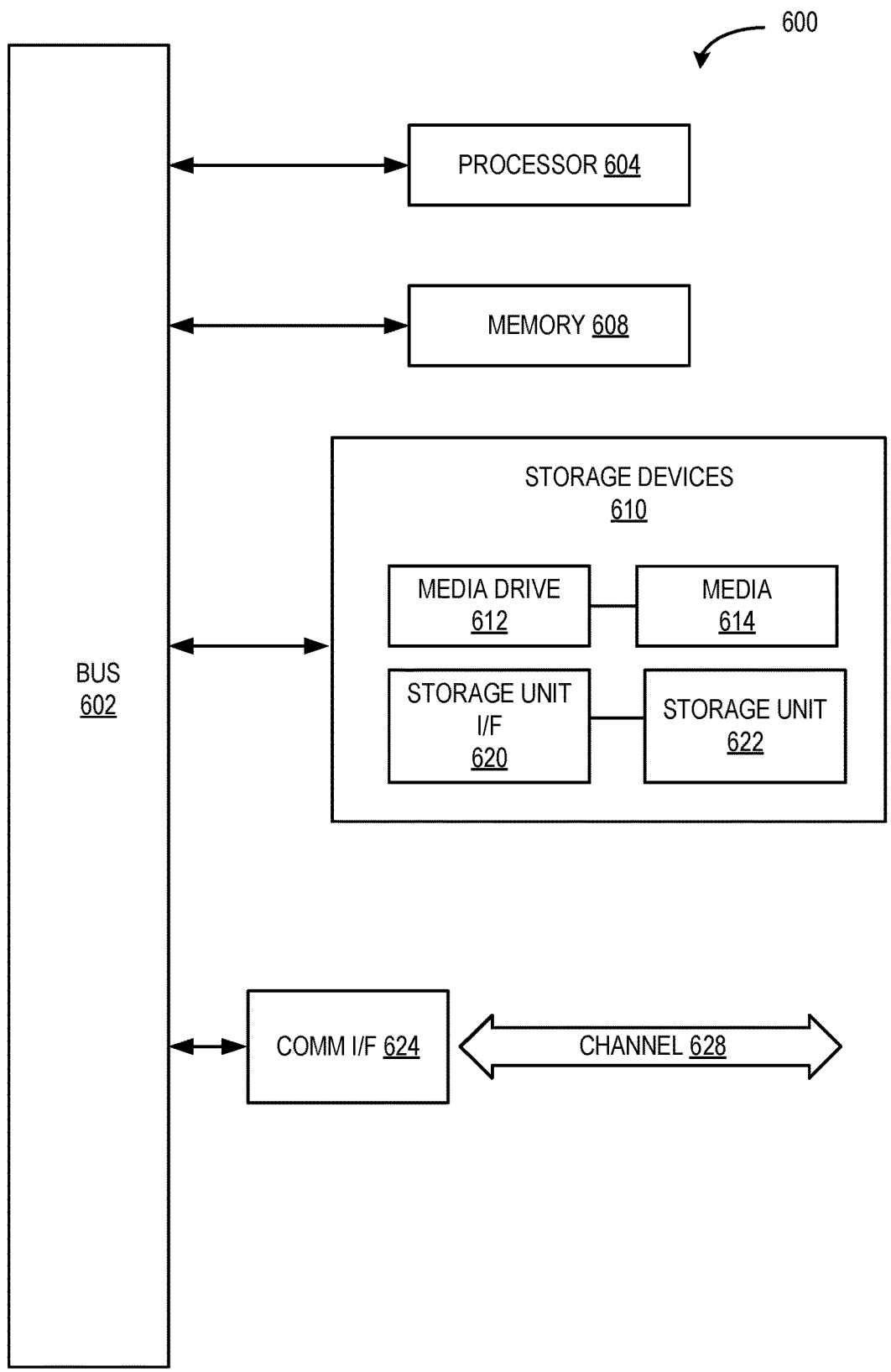
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor 604. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A brake hold tuner, comprising:
one or more processors to execute machine executable instructions to cause the brake hold tuner to
receive signals intended for receipt by a brake hold mechanism of a vehicle; and
based on the received signals, override operation of the brake hold mechanism to control at least one of initiating a brake hold state and inhibiting initiation of a brake hold state.

2. The brake hold tuner of claim 1, further comprising a controller area network (CAN) bus interface for connecting to a CAN bus of the vehicle and enabling the receipt of the signals.

3. The brake hold tuner of claim 1, wherein:
the machine executable instructions further cause the brake hold tuner to obtain information regarding perceived vehicle-related conditions including vehicle operating conditions, and conditions external to the vehicle; and
overriding operation of the brake hold mechanism is also based on the perceived vehicle-related conditions including the vehicle operating conditions, and the conditions external to the vehicle.

4. The brake hold tuner of claim 3, wherein the conditions external to the vehicle comprise at least one of environmental conditions and road conditions.

5. The brake hold tuner of claim 4, wherein the at least one of the environmental conditions and road conditions comprises at least one of currently-monitored environmental conditions and road conditions, and past-monitored environmental conditions and road conditions.

6. The brake hold tuner of claim 3, wherein the vehicle operating conditions comprise at least one of currently-monitored vehicle operating conditions and past-monitored vehicle operating conditions.

7. The brake hold tuner of claim 1, wherein the machine executable instructions that cause the brake hold tuner to inhibit initiation of the brake hold state comprise instructions to override effectuation of the brake hold state that would otherwise occur in accordance with control by the brake hold mechanism of the vehicle.

8. The brake hold tuner of claim 1, wherein the machine executable instructions that cause the brake hold tuner to initiate a brake hold state comprise instructions to calculate whether an amount of time expected to be spent in the brake hold state matches or exceeds a minimum brake hold state time threshold.

9. A brake hold tuner, comprising:
one or more processors to execute machine executable instructions to cause the brake hold tuner to:
intercept a first brake hold-related control signal sent by a controller for intended receipt by a brake actuator of a vehicle, wherein the intercepting prevents the first brake hold-related control signal from reaching the brake actuator; and
based on at least one of the first brake hold-related control signal or perceived vehicle-related conditions, send a second brake-hold related control signal to the brake actuator instead of the first brake-hold related control signal.

10. The brake hold tuner of claim 9, wherein:
the machine executable instructions further cause the brake hold tuner to determine the second brake-hold related control signal to exit a brake hold state within a pre-determined time before a traffic light changes from red to green based on known timing of the traffic light.

11. The brake hold tuner of claim 9, further comprising a controller area network (CAN) bus interface for connecting to a CAN bus of the vehicle and enabling the interception of the first brake hold-related control signal.

12. The brake hold tuner of claim 9, wherein the perceived vehicle-related conditions comprise vehicle operating conditions and conditions external to the vehicle.

13. The brake hold tuner of claim 12, wherein the conditions external to the vehicle comprise at least one of environmental conditions and road conditions.

14. The brake hold tuner of claim 13, wherein the at least one of the environmental conditions and road conditions comprises at least one of currently-monitored environmental conditions and road conditions, and past-monitored environmental conditions and road conditions.

15. The brake hold tuner of claim 12, wherein the vehicle operating conditions comprise at least one of currently-monitored vehicle operating conditions and past-monitored vehicle operating conditions.

16. The brake hold tuner of claim 9, wherein intercepting the first brake-hold control signal inhibits initiation of a brake hold state that would otherwise be initiated in accordance with the first brake-hold related control signal.

17. The brake hold tuner of claim 9, wherein intercepting the first brake-hold control signal maintains a brake hold state that would otherwise be exited in accordance with the first brake-hold related control signal.

18. The brake hold tuner of claim 9, wherein the second brake-hold related control signal comprises a control signal to exit a brake hold state.

19. The brake hold tuner of claim 9, wherein the second brake-hold related control signal comprises a control signal to initiate a brake hold state.

20. A brake hold tuner, comprising:
a controller area network (CAN) bus interface for connecting to a CAN bus of a vehicle; and
one or more processors to execute machine executable instructions to cause the brake hold tuner to:
intercept, via the CAN bus interface, a first brake hold-related control signal sent by a controller for intended receipt by a brake actuator of the vehicle, wherein the intercepting prevents the first brake hold-related control signal from reaching the brake actuator; and
based on at least one of the first brake hold-related control signal or perceived vehicle-related conditions, send a second brake-hold related control signal to the brake actuator instead of the first brake-hold related control signal.

* * * * *